United States Patent [19]

Postle et al.

[11] 4,294,917
[45] Oct. 13, 1981

[54] PHOTOGRAPHIC SILVER HALIDE MATERIAL CONTAINING A DYE FILTER OR A DYE ANTI-HALATION LAYER

[75] Inventors: Stephen R. Postle, Brentwood; Alexander Psaila, Chelmsford, both of England

[73] Assignee: Ciba-Geigy AG, Basel, Switzerland

[21] Appl. No.: 145,175

[22] Filed: Apr. 30, 1980

[30] Foreign Application Priority Data

May 22, 1979 [GB] United Kingdom ............... 17693/79

[51] Int. Cl.³ .............................................. G03C 1/84
[52] U.S. Cl. .................................... 430/522; 430/595
[58] Field of Search ............................... 430/522, 595

[56] References Cited

U.S. PATENT DOCUMENTS 2,036,546  4/1936  Schneider ........................... 430/522
2,533,472  12/1950  Keyes ................................. 430/522

FOREIGN PATENT DOCUMENTS 1278621  6/1972  United Kingdom ................ 430/522
1521083  8/1978  United Kingdom ................ 430/522

*Primary Examiner*—Mary F. Downey
*Attorney, Agent, or Firm*—Sprung, Felfe, Horn, Lynch & Kramer

[57] ABSTRACT

A photographic silver halide material is provided which comprises in at least one layer a solid dispersion of a water-insoluble dye of the formula

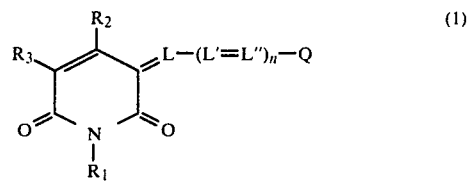

wherein each of L, L' and L" are an optionally substituted methine group, n is 0 or 1, Q is an optionally substituted aryl group or an optionally substituted heteroaromatic group, $R_1$ represents a hydrogen atom or an optionally substituted alkyl, aralkyl, cycloalkyl, aryl or heterocyclic radical or an optionally substituted amino group, $R_2$ represents a hydrogen atom or a hydroxy, amino, —CN, —COOR$^1$, —CONR$^1$R$^2$ or —COR$^1$ group or an optionally substituted alkyl, aralkyl, cycloalkyl, aryl or heterocyclic radical, and $R_3$ represents a —CN, —COOR$^3$, —CONR$^3$R$^4$, —SO$_3$H, —SO$_3^\ominus$ or —COR$^3$ group, where R$^1$, R$^2$, R$^3$ and R$^4$ each independently represent a hydrogen atom or an optionally substituted alkyl, aralkyl, cycloalkyl, aryl or heterocyclic radical, in a binder.

The solid dispersion of the dye is finely divided in the binder material of said layer which normally is a filter or anti-halation layer. A marked increase in sharpness of the images obtained from photographic material containing in at least one layer the solid dye dispersion can be observed.

6 Claims, 1 Drawing Figure

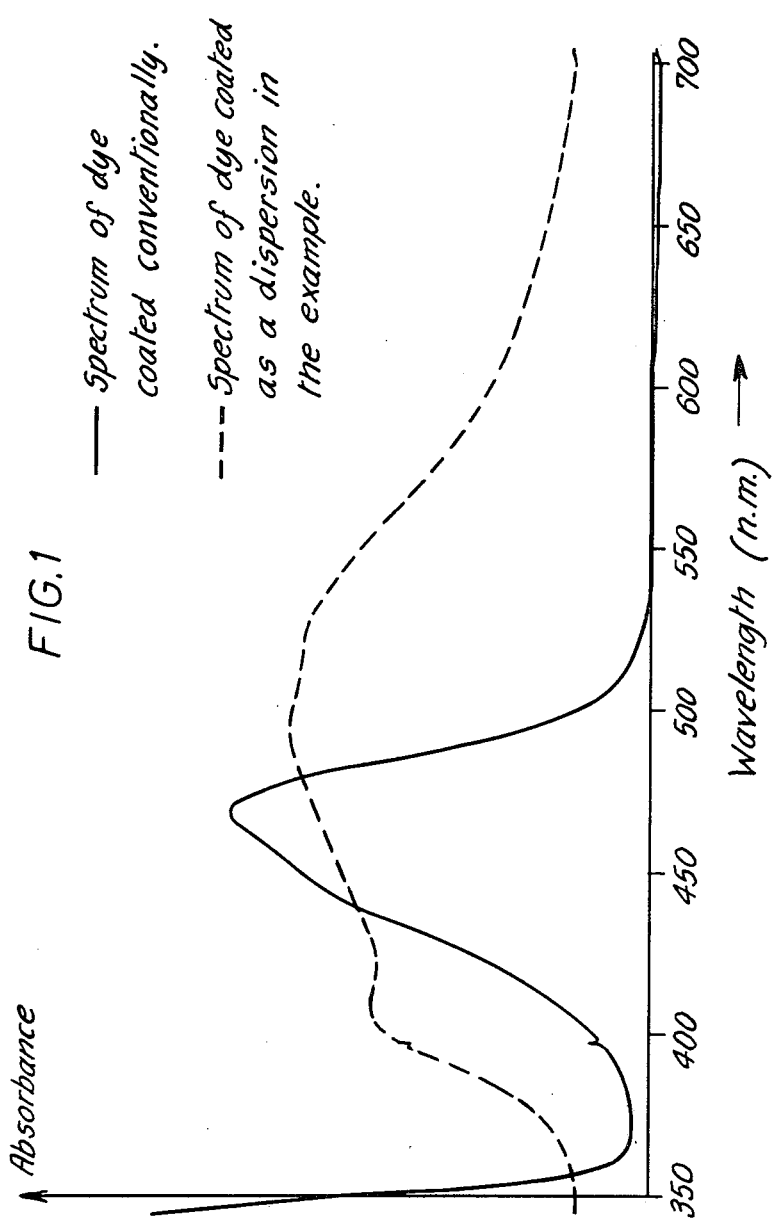

PHOTOGRAPHIC SILVER HALIDE MATERIAL CONTAINING A DYE FILTER OR A DYE ANTI-HALATION LAYER

The present invention relates to photographic silver halide material which contains either a dye filter layer or a dye anti-halation layer.

Dyes used either in filter layers or anti-halation layers and in particular in anti-halation underlayers in photographic material must be substantive to the layer in whcih they are coated and must be readily bleachable. Also in the case of anti-halation dyes they should have as wide a spectral absorption as possible.

We have found that a certain class of dyes when present as a solid dispersion in a layer in the photographic material are of great use as filter or anti-halation dyes.

Therefore according to the present invention there is provided photographic silver halide material which comprises in at least one layer a solid dispersion of a water-insoluble dye of the formula

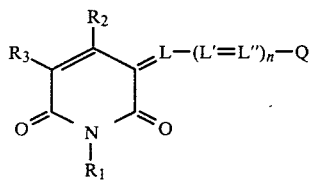

(1)

wherein each of L, L' and L'' are an optionally substituted methine group, n is 0 or 1, Q is an optionally substituted aryl group or an optionally substituted heteroaromatic group, $R_1$ represents a hydrogen atom or an optionally substituted alkyl, aralkyl, cycloalkyl, aryl or heterocyclic radical or an optionally substituted amino group, $R_2$ represents a hydrogen atom or a hydroxy, amino, —CN, —COOR$^1$, —CONR$^1$R$^2$ or —COR$^1$ group or an optionally substituted alkyl, aralkyl, cycloalkyl, aryl or heterocyclic radical, and $R_3$ represents a —CN, —COOR$^3$, —CONR$^3$R$^4$, —SO$_3$H, —SO$_3^\ominus$ or —COR$^3$ group, where R$^1$, R$^2$, R$^3$ and R$^4$ each independently represent a hydrogen atom or an optionally substituted alkyl, aralkyl, cycloalkyl, aryl or heterocyclic radical, in a binder.

Throughout the specification the terms lower alkyl and lower alkoxy are used to denote alkyl or alkoxy radicals respectively containing from 1 to 6 carbon atoms.

The optionally substituted alkyl radicals represented by $R_1$ and $R_2$ and R$^1$, R$^2$, R$^3$ and R$^4$ are preferably lower alkyl groups or substituted lower alkyl radicals, and as specific examples of such radicals there may be mentioned methyl, ethyl, n-propyl, n-butyl, n-octyl, n-decyl and n-dodecyl, hydroxy lower alkyl such as β-hydroxyethyl, lower alkoxy alkyl such as β-(methoxy or ethoxy)-ethyl and γ-methoxypropyl, cyanomethyl, carbamoylmethyl, carboethoxymethyl, acylmethyl or acylethyl such as acetylmethyl, and β-aminoethyl.

As examples of aralkyl radicals represented by $R_1$, $R_2$, R$^1$, R$^2$, R$^3$ and R$^4$ there may be mentioned benzyl and β-phenyl ethyl.

As an example of a cycloalkyl radical represented by $R_1$, $R_2$, R$^1$, R$^2$, R$^3$ and R$^4$ there may be mentioned cyclohexyl. The optionally substituted aryl radicals represented by $R_1$, $R_2$, R$^1$, R$^2$, R$^3$ and R$^4$ are preferably phenyl or optionally substituted phenyl radicals, and as specific examples of such radicals there may be mentioned phenyl, tolyl, chlorophenyl, methoxyphenyl and ethoxyphenyl. The optionally substituted heterocyclic radicals represented by $R_1$, $R_2$, R$^1$, R$^2$, R$^3$ and R$^4$ are preferably 5- and 6-membered heterocyclic rings and as specific examples of such radicals there may be mentioned 2-pyridyl, 2-thiazolyl, 1-piperidinyl and 1-morpholinyl, each of which may be substituted.

Q is preferably a phenyl group substituted by halogen, hydroxy and especially by di-lower-alkylamino, such as di-methylamino. Examples of a heterocyclic ring system for Q are benzimidazol, benzoxazole, benzthiazole, benzselenazole, lepidinole, quinole and especially indole, which all can be substituted by hydroxy, halogen, cyano, nitro and lower alkyl.

Dyes of formula (1) are readily bleached by the sulphite in photographic processing solutions, especially in photographic silver halide developing solution.

However the most readily bleached dyes of formula (1) are those wherein L, L' and L'' are methine (—CH═ or ═CH—), $R_1$ is hydrogen, alkyl of 1 to 4 carbon atoms, hydroxyalkyl of 2 to 4 carbon atoms or an esterified hydroxyalkyl, e.g. of the formula

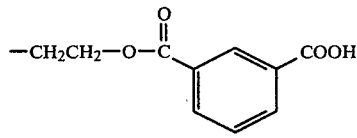

or aminoalkyl of 2 to 4 carbon atoms, $R_3$ is an electron withdrawing group such as —CN, —COOR$^3$, —CONR$^3$R$^4$ or —COR$^3$, R$^3$ and R$^4$ are hydrogen or alkyl of 1 to 4 carbon atoms and $R_2$ is an optionally substituted lower alkyl group, preferably alkyl of 1 to 4 carbon atoms. Most preferably $R_3$ is —CN.

Preferably the dye of formula (1) should also comprise a hydrophilicising group, that is to say a group which promotes hydrogen bonding. The presence of such a group helps the washing-out of the residues of the dye from the photographic material after the dye has been destroyed by bleaching. However it is important that in spite of the presence of the hydrophilicising group the dye is water-insoluble. Examples of hydrophilicising groups are amino, hydroxyl and carboxylic acid.

The dyes of formula (1) may be prepared by reacting a hydroxypyridone of formula

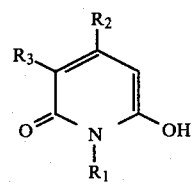

(2)

where $R_1$, $R_2$ and $R_3$ have the meanings assigned to them above with an aldehyde of the formula

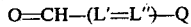

in a suitable solvent medium. Examples of suitable solvents are methanol, acetic acid and 2-methoxyethanol. In some cases it is advantageous to carry out the reaction at elevated temperatures.

The hydroxypyridones of formula (2) can themselves be obtained by a number of methods such as are described for example in "Heterocyclic Compounds—Pyridine and its derivatives-Part 3" which are edited by Klinsberg and published by Interscience Publishers in 1962. Reference is made also to British Pat. No. 1,256,095.

As specific examples of the hydroxypyridones there may be mentioned 2,6-dihydroxy-3-cyano-4-methylpyridine, 1-(methyl or ethyl)-3-cyano-4-methyl-6-hydroxypyrid-2-one, 1-($\beta$-hydroxyethyl or $\gamma$-methoxypropyl)-3-cyano-4-(methyl, phenyl or ethyl)-6-hydroxypyrid-2-one, 1-(phenyl or anisyl)-3-cyano-4-(methyl or phenyl)-6-hydroxypyrid-2-one, 1-phenyl-3-carbonamido or carboethoxy)-4-(methyl or phenyl)-6-hydroxypyrid-2-one, 2.6-dihydroxy-3-(carboethoxy or carbodiethylamido)-4-methylpyridine, 2,6-dihydroxy-3-(carbonamido or carboethoxy)-pyridine, 2,6-dihydroxy-2-carbonamido-4-phenylpyridine, 2,6-dihydroxy-3-cyano-4-carbonamidopyridine, 2,6-dihydroxy-3-cyano-4-(carbomethoxy-or carboethoxy)pyridine, ethyl-2,6-dihydroxy-3-cyanopyrid-4-ylacetate, 2,6-dihydroxy-3-cyanopyrid-4-ylacetamide, 2,6-dihydroxy-3,4-di-(carboethoxy)-pyridine, 2,6-dihydroxy-3-carbonamido-4-carboethoxypyridine, ethyl-2,6-dihydroxy-isonicotinate, 2,6-dihydroxy isonicotinamide, 2,6-dihydroxy isonicotinic acid diethylamide and 2,6-dihydroxy-3-cyano-4-ethoxycarbonyl-1-methylpyridine.

It is an essential feature of the photographic material of the present invention that the dyes of formula (1) should be present in the photographic material as a solid dispersion. Attempts to incorporate the dyes in coated layers by other means, for example solvent solutions coatings, have been unsuccessful on account of the very low solubility of these dyes in polar solvents such as methanol, ethanol, acetone, ethyl acetate, dichloromethane and oils such as tricresol phosphate. Such coatings are low in density and of considerably narrower spectral coverage. Also these caotings are invariably of poor quality owing to uncontrolled precipitation of the dye in the layer. The presence of oil increases the thickness of the layer and reduces the bleachability of the dye.

Further the dyes of formula (1) when present in coated layers as solid dispersions exhibit a greater range of useful spectral absorptions than when coated by other means.

The preferred binder for the dyes of formula (1) is gelatin, especially when the layer containing the dyes is a filter layer or an anti-halation underlayer.

A solid dispersion of the dyes of formula (1) may be prepared by forming the dyes in situ in a gelatin medium, carefully controlling the precipitation of the dye as formed. The gelatin medium containing the solid dye can then be coated as a layer in the photographic material.

Alternatively a solid dispersion of the dye may be formed in a binder by a milling technique wherein a water slurry of the dye together with a nonionic and/or an anionic wetting agent are placed together with water in a colloidal mill which is charged with grinding media of 0.7 to 1.00 mm diameter. The mill is operated until the average particle size of the dye is less than 1 $\mu$m in diameter, which is a mean size of 0.4 to 0.5 $\mu$m.

A solution of the binder medium (usually gelatin in water) together with a wetting agent is then added to the aqueous dye dispersion after removal from the mill. The concentration of the dispersion with regard to both the dye concentration and the binder concentration can then be made.

Formulation of the dyes of formula (1) as solid dispersions enables neutral colour underlayers, which cover virtually all the actinic light range, to be prepared using one or two dyes only. Dyes of formula (1) as solid dispersions may be mixed with one another without any destabilization of the dispersion or adverse effect on bleachability or substantivity of the dyes.

The following preparations illustrate the preparation of dyes of formula (1).

PREPARATION 1

Dye of the formula

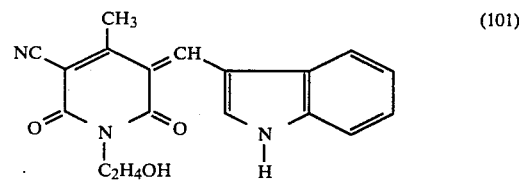

3-Cyano-1-(2'-hydroxyethyl)-6-hydroxy-4-methylpyrid-2-one (19.4 g) and indole-3-carboxaldehyde (14.5 g) were stirred in methanol (100 ml) at 20° for 2 hours. The mixture was diluted with ether (400 ml) and the precipitated dye washed with ether (200 ml) and dried in vacuo (29.9 g). $\lambda$max (CH$_3$OH)=475 nm.

PREPARATION 2

Dye of the formula

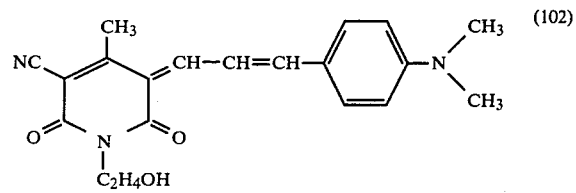

As Preparation 1, using instead 4-dimethylaminocinnamaldehyde (17.5 g) and 2-methoxyethanol (200 ml) as solvent. Yield of dye=28.8 g. $\lambda$max (CH$_3$OH)=618 nm.

PREPARATION 3

Dye of the formula

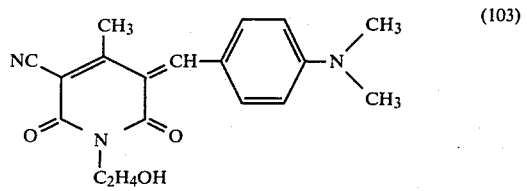

As for Preparation 1 using instead 4-dimethylaminobenzaldehyde (14.9 g). The reaction is carried out at reflux for 30 min. Yield of dye=30.9 g. $\lambda$max (CH$_3$OH)=530 nm.

PREPARATION 4

Dye of the formula

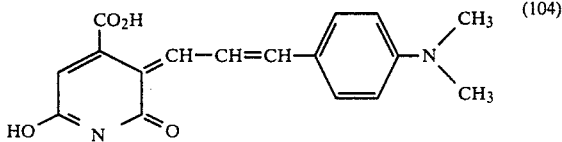
(104)

As for Preparation 2 using instead citrazinic acid (15.5 g). The reaction is carried out at reflux for 30 min. Yield of dye = 13.2 g. λmax (CH$_3$OH) = 575 nm.

PREPARATION 5

Dye of the formula

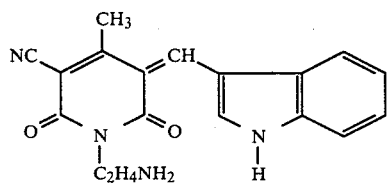
(105)

1-(2'-aminoethyl)-3-cyano-6-hydroxymethylpyrid-2-one (19.3 g) and indole-3-carboxaldehyde (14.5 g) were dissolved in 200 ml acetic acid and refluxed for 30 min. The mixture was diluted with 400 ml ether and the precipitated dye washed with methanol, followed by ether and dried in vacuo. Yield 18.4 g. λmax (CH$_3$OH) = 474 nm.

PREPARATION 6

Dye of the formula

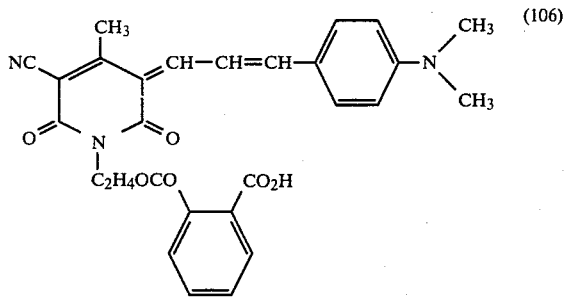
(106)

1-2'-(2''-carboxybenzoyl)oxyethyl-3-cyano-6-hydroxy-4-methylpyrid-2-one (3.07 g) and 4-dimethylaminocinnamaldehyde (1.57 g) were heated at reflux in 2-methoxyethanol (18 ml) for 30 min. The cooled solution was diluted with ether (40 ml), and the precipitated dye was washed with water (100 ml), then boiled with ethanol (10 ml), filtered and washed with ethanol (50 ml) to give the pure dye (2.40 g). λmax (CH$_3$OH) = 625 nm.

EXAMPLE 10 g of the dye of formula (101) was made into a water slurry using 1.0 g of a 10% solution of the non-ionic wetting agent (adduct of octylphenol and 10 moles of ethylene oxide) and 1.0 g of a 10% solution of the anionic wetting agent (adduct of octyl-methyl-phenol and 8 moles of ethylene oxide, sulfonated, sodium salt). The total amount of water present in the slurry was 80 g. The slurry was charged into a colloidal mill which had been charged with grinding media of 0.75 to 1.00 mm. The slurry was milled at 3000 rpm for 1 hour, after which time it had a particle size distribution of less than 1 μm in diameter.

The aqueous dispersion of the dye was then removed from the mill and to it was added 2.5 kg of a 4% aqueous gelatin solution having a pH of 6.0. The gelatin used was a decationised blend. The gelatin solution was added slowly with stirring to the aqueous dispersion of the dye. This concentration is such that when the aqueous gelatin dye dispersion is coated as a layer in a panchromatically sensitized silver halide emulsion material it will produce a density of 1.0 at λmax when coated at a coating weight of 20 mg/dm$^2$ of gelatin which is a coating of 1.2 mg/dm$^2$ of dye.

This dye dispersion in aqueous gelatin solution was coated on to clear cellulose triacetate base 150 microns thick to give a coating weight of 20 mg/dm$^2$. This coating was then dried and overcoated with a panchromatically sensitized silver iodobromide emulsion having a coating weight of 50 mg/dm$^2$ of silver, of 80 mg/dm$^2$ of gelatin. This layer was dried and overcoated with a gelatin solution containing 8 cm$^3$ of 6% formaldehyde hardener solution per 100 g of gelatin to provide a non-stress or supercoat layer with a coating weight of 12 mg/dm$^2$ of gelatin. The dyed gelatin layer thus constituted an anti-halation underlayer.

During these coating operations no dye was observed to leach out of the dyed underlayer.

Similar photographic material was prepared except that no dye was present in the gelatin underlayer. This material was used in a comparison test.

Strips of both sets of photographic material were imagewise exposed behind a wedge and processed as follows:

| | |
|---|---|
| Silver halide developing solution 6½ minutes at 20° C. | |
| Solution:  p-N-methylaminophenol sulfate | 2 g |
| Anhydrous sodium sulphite | 100 g |
| Hydroquinone | 5 g |
| Borax | 2 g |
| Water to | 1 litre |
| Water wash bath ½ minute at 20° C. | |
| Silver halide fixing bath 10 minutes at 20° C. | |
| Solution:  Sodium thiosulphate | 300 g |
| Anhydrous sodium sulphite | 15 g |
| Glacial acetic acid | 10 g |
| Boric acid | 7.5 g |
| Potassium alum | 15 g |
| Water to | 1 litre |
| Final water wash bath 15 minutes at 20° C. | |

After completion of the processing no sign of dye in the anti-halation underlayer was visible. The dye was completely and irreversibly destroyed in the silver halide developing solution and no discolouration of any of the processing solutions was visible.

The sensitometric properties of the two sets of photographic strips were compared and the speed, contrast and D$_{max}$ of the sets of stripe were similar. However a marked increase in sharpness of the final image was observable in the strips which had before processing the anti-halation underlayer which comprised a solid dispersion of dye of formula (101).

Five similar sets of strips were prepared which contained in the anti-halation underlayers dyes of formulae (102) to (106) respectively. These five sets of strips were also tested together with strips which did not have an anti-halation underlayer but which were similar in all other respects. In all five sets of strips the dye in the anti-halation underlayer was completely and irreversibly bleached. In all five sets of strips the sensitometric properties of the material were assessed after processing and were all similar and also similar to the material which had no anti-halation underlayer. However the image in all five sets of strips was markedly sharper than the image in the material which did not have the dyed anti-halation underlayer.

In order to show that all six dyes were entirely substantive to the gelatin underlayer gelatin dispersions of the six dyes were prepared as just described and these dispersions were coated as layers on six strips of clear cellulose triacetate base again at a gelatin coating weight of 20 mg/dm² and a dye coating weight of 1–2 mg/dm². No hardener was added in this test. The spectral absorption of each strip was measured. All six strips were immersed in separate water baths for 30 minutes at 25° C., at the end of this period they were removed and dried. No colouration of the water was observed in any of the six baths. The spectral absorption of each strip was then re-measured and in every case was found to be unaltered.

In order to show the improvement obtained in the spectral absorption, the spectra of the photographic material containing a solid dispersion of dye of formula (101) and a material containing the same dye in acetone solution are compared. When dye of formula (101) has been dissolved in acetone the material exhibits a narrow spectral absorption between about 425 and 475 nm. However when the dye has been formulated in the anti-halation layer as a solid dispersion the material shows a very broad spectral band between 370 up to 650 nm and some absorption even beyond, extending well into the infrared region as in the Figure.

The solid dispersion formulation was coated in a photographic assembly as an anti-halation underlayer as just described. A similar photographic material was prepared except that no dye was present in the gelatin underlayer. This material was used in a comparison test.

The sensitometric properties of both processed strips were similar, however the sharpness of the material in which dye of formula (101) had been formulated in the anti-halation layer as a solid dispersion was markedly superior.

Comparable results were obtained when using the dyes of formulae (102) to (106).

We claim:

1. Photographic silver halide material which comprises in at least one layer a solid dispersion of a water-insoluble dye of the formula

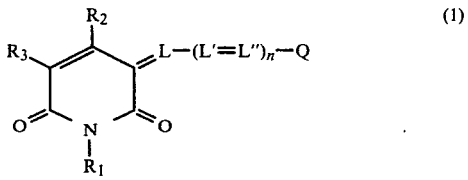

wherein each of L, L' and L" are an optionally substituted methine group, n is 0 or 1, Q is phenyl or phenyl substituted by halogen, hydroxy or di-lower-alkylamino, or benzimidazole, benzoxazole, benzthiazole, benzselenazole, lepidinole, quinole or indole which are unsubstituted or substituted by halogen, cyano, nitro or lower alkyl, $R_1$ represents a hydrogen atom or an optionally substituted alkyl, benzyl, β-phenylethyl, cycloalkyl, phenyl, tolyl, chlorophenyl, methoxyphenyl, ethoxyphenyl or heterocyclic radical or an optionally substituted amino group, $R_2$ represents a hydrogen atom or a hydroxy, amino, —CN, —COOR$^1$, —CONR$^1$R$^2$ or —COR$^1$ group or an optionally substituted alkyl, benzyl, β-phenylethyl, cycloalkyl, phenyl, tolyl, chlorophenyl, methoxyphenyl, ethoxyphenyl or heterocyclic radical, and $R_3$ represents hydrogen, a —CN, —COOR$^3$, —CONR$^3$R$^4$, —SO$_3$H, —SO$_3^\ominus$ or —COR$^3$ group, where $R^1$, $R^2$, $R^3$ and $R^4$ each independently represent a hydrogen atom or an optionally substituted alkyl, benzyl, β-phenylethyl, cycloalkyl, phenyl, tolyl, chlorophenyl, methoxyphenyl, ethoxyphenyl or heterocyclic radical, in a binder.

2. Photographic silver halide material according to claim 1, wherein L, L' and L" represent a methine group, $R_1$ is hydrogen, alkyl of 1 to 4 carbon atoms, hydroxyalkyl of 2 to 4 carbon atoms, an esterified hydroxyalkyl or aminoalkyl of 2 to 4 carbon atoms, $R_3$ is —CN, —COOR$^3$, —CONR$^3$R$^4$ or —COR$^3$, $R^3$ and $R^4$ are hydrogen or alkyl of 1 to 4 carbon atoms and $R_2$ is alkyl of 1 to 4 carbon atoms.

3. Photographic silver halide material according to claim 1 wherein the water-insoluble dye of formula (1) comprises a hydrophilicising group.

4. Photographic silver halide material according to claim 3, wherein the water-insoluble dye of formula (1) comprises an amino, hydroxyl or carboxylic acid group as hydrophilicising group.

5. Photographic silver halide material according to claim 1 wherein the binder is gelatin.

6. Photographic silver halide material according to claim 1 wherein the layer of the photographic material is an anti-halation underlayer.

* * * * *